May 8, 1956     M. B. ZUCCHINO     2,745,056
MAGNETIC AMPLIFIER CIRCUIT
Filed May 4, 1953
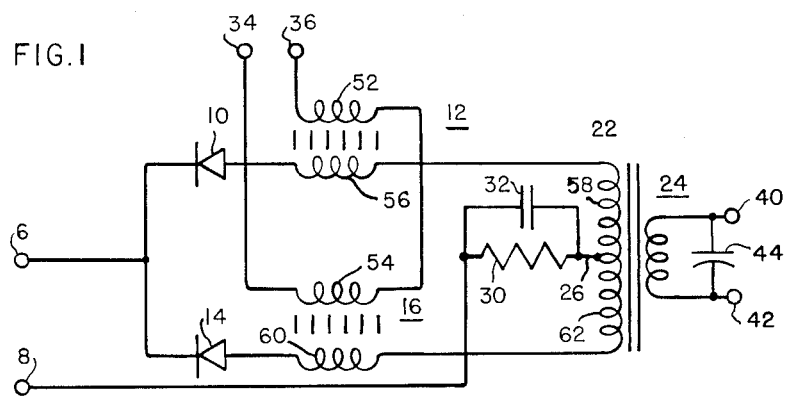
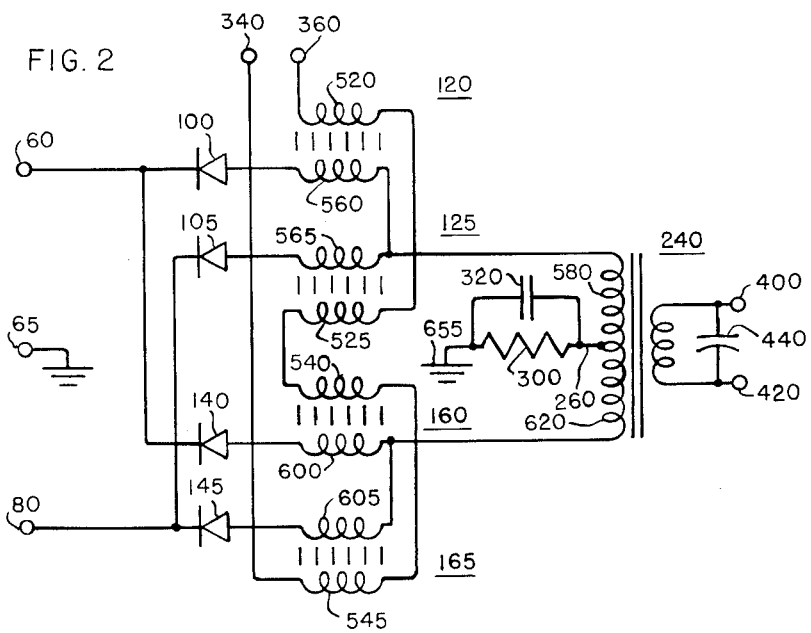
INVENTOR.
MARCEL B. ZUCCHINO
BY
Harry M. Saragovitz
Attorney

United States Patent Office 2,745,056
Patented May 8, 1956

2,745,056

MAGNETIC AMPLIFIER CIRCUIT

Marcel B. Zucchino, Long Branch, N. J., assignor to the United States of America as represented by the Secretary of the Army Application May 4, 1953, Serial No. 353,023

5 Claims. (Cl. 323—89)

(Granted under Title 35, U. S. Code (1952), sec. 266)

The invention described herein may be manufactured and used by or for the Government for governmental purposes, without the payment of any royalty thereon.

The subject invention relates to circuits using saturable reactors and more particularly to the magnetic amplifier circuits for use with saturable reactors.

A saturable reactor is in itself very old in the art and represents generally an inductor having a magnetic core and means for substantially saturating it. At this point the inductance can be varied considerably with slight changes in the flux density of the magnetic core.

The saturable reactor is inherently limited by what is called the equal ampere-turns law, which states that the ampere-turns of the control winding must equal or be more than the ampere-turns of the load winding or else the load current will reverse and override the control current. This limitation of saturable reactors has to some extent been overcome by the introduction of what is now generally termed magnetic amplifiers wherein a portion of the alternating current output is fed back through rectifiers, in phase with the input or control winding current, to reinforce the original control signal and require less control power, thereby increasing sensitivity of a given saturable reactor and providing control for correspondingly greater output loads.

With improvements of core and rectifier material, the self-saturating circuits become more feasible for magnetic amplifiers. In the self-saturating circuits, the alternating current is rectified before it passes through the reactor so that the reinforcing portion of the output current mentioned above is provided by the rectified component of the alternating current power supply. This provides another way of presetting the saturation of the core.

One of the uses of a self-saturating magnetic amplifier is in the basic circuit for modulating and detecting a given carrier. In this circuit, the alternating current from the power supply is passed through two separate paths including rectifiers and saturable reactors to the opposing windings of a push-pull transformer to be returned to the source of alternating voltage through the center tap of the push-pull transformer. The control windings in this case are in series so that the current in one control winding aids the rectified current in one saturable reactor while oposing the rectified current in the other saturable reactor. The saturable reactors coupled to the primary windings of a push-pull type of transformer provide an opposing direct current through the push-pull windings to neutralize the magnetic field. When no control signal is present, the two branches are balanced. When a control voltage is impressed in one direction, the current in one saturable reactor is increased for the rectified pulse while the current in the other saturable reactor is decreased giving an increase in current in one-half of the primary of the output transformer while decreasing the current in the other half of the output transformer providing an overall change in the magnetic field of the output transformer in a well-known manner to produce a voltage across the secondary winding of the output transformer representing the modulation envelope of the alternating signal voltage.

This particular circuit, while providing a relatively high gain and sensitivity has one inherent disadvantage in that the rectified current flows through the inductance and transformer primary conductors, which have inherently low D. C. resistance. Therefore, a considerable direct current may flow through the system with correspondingly little or no alternating voltage. The system becomes limited by the amount of the direct current it can tolerate rather than by the amount of useful alternating current it can control. The excessive direct current may tend to draw unnecessarily high amounts of power from the input source and cause overheating in the windings without realizing the highest efficiency for the alternating, or useful, current component passing through the system.

It is, therefore, an object of this invention to reduce the losses in a magnetic amplifier.

It is a further object of this invention to reduce the direct current losses in a push-pull self-saturating magnetic amplifier circuit.

It is a further object of this invention to provide a smaller magnetic amplifier for a given output power rating.

It is a further object of this invention to make possible high power magnetic amplifiers which were hitherto impracticable because of the tremendous power drain.

It is a further object of this invention to provide a magnetic amplifier and detector having a relatively high input resistance to direct current without impeding the useful alternating current component.

Other and further objects of this invention will become apparent from the following specification and drawings in which Figure 1 shows a half-wave species and Figure 2 shows a full wave species of this invention.

Referring now more particularly to Figure 1, an alternating current power supply is provided across terminals 6 and 8. This alternating current passes from terminal 6 through the similar paths including rectifier 10 and saturable reactor 12 on one side and rectifier 14 and saturable reactor 16 on the other side to the opposing sides of the primary windings 22 of the output transformer 24. The center tap 26 of the primary winding returns the rectified alternating current through resistor 30 and condenser 32 in parallel to terminal 8. The control signal voltage is applied across terminals 34 and 36 through the saturable reactors 12 and 16. The output of the magnetic amplifier is taken across terminals 40 and 42. A condenser 44 is provided across the output terminals to filter the carrier voltage which is at the frequency of the alternating current across terminals 6 and 8 and thereby smooth the output component to correspond with the input control voltage across terminals 34 and 36.

In operation, the control voltage is applied across terminals 34 and 36 through the control winding 52 of saturable reactor 12 and control winding 54 of saturable reactor 16. The control windings 52 and 54 are oriented so that the magnetic field of the current of one saturable reactor control winding will oppose the magnetic field of its corresponding load or gate winding as established by the current through one recifier, while the magnetic field of the other saturable reactor control winding will add to the magnetic field produced by the current in its corresponding load or gate winding as established by the current through the other rectifier.

The alternating current energy supplied is taken across terminals 6 and 8 and is divided equally, with zero control signal, between the path including rectifier 10, gate winding 56 and transformer primary winding 58 and the path including rectifier 14, gate winding 60 and transformer primary winding 62. The rectified current from both paths is combined at center tap 26 and returned through resistor 30 to terminal 8. The current passing through these paths is in the form of uni-directional half-wave pulses that are normally equal since the halves 58 and 62 of the primary have an equal A. C. impedance and the impedance of the load or gate windings 56 and 60 are equal. It is assumed that the forward impedance of the rectifiers 10 and 14 are substantially equal.

This rectified alternating current provides an initial polarizing or partial saturating current for both reactors. When a control voltage is applied across terminals 34 and 36 a corresponding current will flow through the control windings 52 and 54 of the saturable reactors. This current although the same in both coils will increase the saturation of one coil and decrease the saturation of the other coil. The change in saturation represents an unbalance in impedance between the reactors 12 and 16 so that the rectified alternating current passing through the two paths unbalances and the corresponding amounts of rectified current will vary according to the changes in impedance or difference in impedance between the two paths. This represents an increase in current in one-half of the primary and a decrease in current in the other half of the primary that results in a current being induced across the secondary 40 and 42 in a manner well-known in the art.

As the control voltage is reversed the impedance ratio between the two paths feeding the primary of the transformer will correspondingly reverse and the current through the one-half of the primary of the transformer is now decreased while the current through the other half of the primary of the transformer is increased, thereby reversing the voltage across the output terminals 40 and 42. Thus it is seen that a voltage across the control terminals 34 and 36 produces a corresponding voltage across the output terminals 40 and 42. A condenser 44 across the output terminals provides a shunt path for frequencies as high as the input alternating power supply frequency without substantially reducing alternating voltage at the control frequency. The input alternating power supply frequency may be any desired value and is usually chosen between 400 to 20,000 cycles per second. The input frequency must be substantially greater than the highest frequency of the control voltage.

When the currents through the primary windings of the output transformer are substantially balanced, the component of the control or modulating frequency is balanced out but a substantial ripple component can be passed through condenser 32 which provides the return path for alternating frequencies. The direct current component, however, can be limited to any desired amount by the addition of the resistor 30 in the direct current return path, thus the resistance of the A. C. and D. C. paths may both be substantially balanced or may be varied to any desired ratio to provide the maximum transfer of the useful alternating current components through the saturable reactors and output transformer with the minimum flow of direct current which will be dissipated in the form of heat and otherwise represent a power loss to decrease the efficiency of the entire system. In this manner, the magnetic amplifier efficiency can be greatly increased and higher alternating current power voltages can be handled by the system to provide correspondingly greater outputs for a given sized amplifier.

In Figure 2, the circuit of Figure 1 has been modified by the addition of saturable reactors and a push-pull input for the alternating current power supply to provide push-pull operation of the circuit. The full wave operation increases the efficiency of the system, provides a smoother output for a given control frequency to input frequency ratio and otherwise provides an easier separation of the A. C. carrier component from the modulated input frequency. The elements of Figure 2 are numbered similarly to their corresponding elements of Figure 1. In Figure 2, the alternating current power input, is taken across terminals 60 and 80 and is symmetrical about a ground point 65. In one direction, the alternating current passes through two similar paths. One path comprises the rectifier 100, the gate winding 560 of saturable reactor 120, and the primary winding 580 of the output transformer 240. The other path comprises rectifier 140, gate winding 600 of saturable reactor 160 and the other primary winding 620 of output transformer 240. The return path is through the resistor 300 or condenser 320 to the ground terminal 651. The opposite phase of the alternating current power input is taken from terminal 80 through the one path comprising rectifier 105, gate winding 565 of saturable reactor 125, and primary winding 580 of the output transformer 240. The other path comprises rectifier 145, the gate winding 605 of saturable reactor 165 and the primary winding 620 of the output transformer 240. The return path is again from the center tap terminal 260 of the primary winding through the resistor 300 or condenser 320 to the ground terminal 655.

The control voltage is across terminals 340 and 360 through the control winding 520 of saturable reactor 120, control winding 525 of saturable reactor 125, control winding 540 of saturable reactor 160 and control winding 545 of the saturable reactor 165. The output is taken across terminals 400 and 420 shunted by condenser 440.

The circuit of Figure 2 has alternating current of a positive polarity with respect to ground across terminals 60 and 65 during one-half cycle while the voltage across terminals 80 and 65 is negative. On the next half cycle the voltage across terminals 80 and 65 will be positive while the voltage across terminals 60 and 65 will be negative. In this way, a path is provided through appropriate rectifiers, saturable reactors and the transformer primary for each half cycle of power input instead of for every other half cycle of alternating current input as in the circuit of Figure 1.

In operation, the path for one phase is provided through the separate control paths of rectifier 100, gate winding 560 and transformer primary 580 on one hand and rectifier 140, gate winding 600 and primary 620 on the other hand. The other rectifier and saturable reactor combinations complete similar circuits for the opposite phase. In this case the control windings 520 and 525 will have the same orientation to provide the same direction of magnetic field with respect to the magnetic field of the gate windings 560 and 565 at the same time, whereas control windings 540 and 545 will have the opposite orientation. When control windings 520 and 525 are aiding their respective gate winding magnetic fields, the control windings 540 and 545 will be opposing the magnetic fields produced by the gate windings 600 and 605. Thus, the impedance path for one-half of the primary of the output transformer is reduced for either phase of the alternating current input while the impedance of the circuit including the other primary winding of the output transformer has an opposite effect for either phase of the alternating current power input.

The output signal across 400 and 420 will be produced in the same way as the output voltage across 40 and 42 of Figure 1, excepting that here the rectified driving voltages are full wave whereas in the earlier case the rectified driving voltages were half wave. The output voltage wave-form will be substantially the same as the control voltage wave-form and may be of considerably greater power. The ripple voltage at the frequency of the alternating current input can be filtered out by condenser 440.

The direct current paths for both phases of the alternating current power input, through the rectifiers, saturable reactor gate windings and primary of the transformer, have an inherently low impedance, and the direct current component in transformer 240 would have a relatively high level for a given alternating current input, without the resistor 300. In this case, the direct current losses would be comparatively high and would seriously restrict the efficient use of the alternating current component.

The use of the resistance 300 provides an increase in the resistance of the rectified current paths to a sufficient level that the alternating current can be increased, thereby providing a maximum alternating current level for a minimum of direct current losses.

The minimum to which the direct current can be reduced is an amount sufficient to energize the saturable reactor to its operating level. This amount can be regulated by suitable variation of the resistor 300. As much alternating current component can be utilized as the power handling capacity of the reactor and transformer will tolerate.

The pulses of alternating current, representing the ripple of the system, this time at full wave frequency, are again shunted through a condenser 320 to bypass the resistance 300 to ground, thereby providing a path of increased D. C. resistance with no increase in A. C. impedance.

Having thus described this invention, what is claimed is:

1. A magnetic amplifier comprising; an alternating current supply, a source of control voltage, a first and a second rectifier, a first and a second saturable reactor each having a gate winding and a control winding, a transformer having a center tapped push-pull wound primary and a secondary, a resistor, a first condenser, said first rectifier connected to the gate winding of said first saturable rectifier which is connected to one-half of the primary winding of said transformer, the second rectifier connected to the gate winding of said second saturable reactor which is connected to the other half of the primary winding of said transformer, said resistor connected from the center tap of the primary of said transformer to one terminal of said alternating current supply, the other terminal of said alternating current supply connected to said first and second rectifiers, said first condenser connected across said resistor, the control winding of said first saturable reactor connected in series with the control winding of said second saturable reactor across said source of control voltage, a utilization circuit connected across the secondary of said push-pull output transformer and a second condenser connected across the secondary of said push-pull output transformer.

2. A magnetic amplifier comprising; first and second saturable reactors, a source of alternating current, a source of control voltage, a push-pull output transformer, a first rectifier connected to one terminal of said source of alternating voltage, the load winding of said first saturable reactor connecting said first rectifier to one-half of the primary of said push-pull output transformer, a second rectifier connected to the one terminal of said source of alternating voltage, the load winding of said second saturable reactor connecting said second rectifier to the other half of the primary of said output transformer, a resistor connecting the center tap of the primary of said output transformer to the other teminal of said souce of alternating voltage, a condenser in parallel with said resistor, the control windings of said first and second saturable reactors connected across said source of control voltage and a smoothing condenser connected across the secondary of said output transformer.

3. In a magnetic amplifier as in claim 2, said resistor having a value substantially equal to the alternating current impedance of each half of said transformer primary.

4. A magnetic amplifier comprising; a source of alternating current, a source of control voltage, a first and second saturable reactor, a push-pull output transformer, a resistor and a condenser, means for rectifying said alternating current, a first path for said rectified alternating current through said first saturable reactor load winding and one-half of the primary of said output transformer to one end of said resistor, a second path for said rectified alternating current through said second saturable reactor and the other half of the primary of said output transformer to the one end of said resistor, said source of alternating current connected between said rectifying means and the other end of said resistor, a condenser having a substantially lower impedance than said resistor at the frequency of said alternating current connected in parallel with said resistor, the control windings of said second saturable reactor connected across said source of control voltage, said control windings of said saturable reactors connected to increase the magnetic flux, in one saturable reactor while decreasing the magnetic flux in the other saturable reactor.

5. In a magnetic amplifier, a first, second, third and fourth rectifiers, a first, second, third and fourth saturable reactors having gate windings and control windings, a source of alternating current, said source of alternating current having a grounded center tap, a push-pull output transformer, a first electrical path from one terminal of said source of alternating current through said first rectifier and the gate winding of said first saturable reactor to one half of the primary of said push-pull output transformer, a second electrical path from the other terminal of said source of alternating voltage through said second rectifier and the gate winding of said second saturable reactor to said one-half of the primary of said output transformer, a third electrical path from said first terminal of said source of alternating voltage through said third resistor and the gate winding of said third saturable reactor to the other half of the primary of said output transformer and a fourth electrical path from said second terminal of said source of alternating voltage through said fourth rectifier and the gate winding of said fourth saturable reactor to said other half of the primary of said output transformer, a resistor, the center tap of the primary of said output transformer grounded through said resistor, a first condenser in parallel with said resistor, a smoothing condenser across the secondary winding of said output transformer and a source of control voltage connected to the control windings of said saturable reactors.

References Cited in the file of this patent

UNITED STATES PATENTS

| | | |
|---|---|---|
| 2,157,834 | Schmidt | May 9, 1939 |
| 2,509,738 | Lord | May 30, 1950 |
| 2,636,150 | McKenney et al. | Apr. 21, 1953 |
| 2,653,293 | Huge | Sept. 22, 1953 |
| 2,688,723 | Kadushin et al. | Sept. 7, 1954 |